(12) United States Patent
Williford et al.

(10) Patent No.: US 12,407,150 B2
(45) Date of Patent: Sep. 2, 2025

(54) ELECTRICALLY INSULATED BOOTS PREVENTING UNINTENDED CONTACT WITH LIVE ELECTRICAL CONDUCTORS

(71) Applicant: Schneider Electric USA, Inc., Andover, MA (US)

(72) Inventors: Matthew Alan Williford, Nashville, TN (US); Sergio Flores, Smyrna, TN (US); Robert Heath Martin, Antioch, TN (US); David Price, Murfreesboro, TN (US); Gregory O. Motley, Murfreesboro, TN (US)

(73) Assignee: Schneider Electric USA, Inc., Boston, MA (US)

( * ) Notice: Subject to any disclaimer, the term of this patent is extended or adjusted under 35 U.S.C. 154(b) by 622 days.

(21) Appl. No.: 17/562,292

(22) Filed: Dec. 27, 2021

(65) Prior Publication Data

US 2022/0209512 A1    Jun. 30, 2022

Related U.S. Application Data

(60) Provisional application No. 63/131,514, filed on Dec. 29, 2020.

(51) Int. Cl.
*H02B 1/46* (2006.01)
*H02B 1/20* (2006.01)

(52) U.S. Cl.
CPC ...... *H02B 1/46* (2013.01); *H02B 1/20* (2013.01)

(58) Field of Classification Search
CPC ................................. H02B 1/46; H02B 1/20
USPC ............................................. 439/142
See application file for complete search history.

(56) References Cited

U.S. PATENT DOCUMENTS

| | | | | | |
|---|---|---|---|---|---|
| 3,278,674 | A | * | 10/1966 | Chickvary | H01R 4/48 439/367 |
| 3,812,279 | A | * | 5/1974 | Voegeli | H02G 3/14 70/172 |
| 4,063,110 | A | * | 12/1977 | Glick | H01R 13/6397 174/67 |
| 4,138,187 | A | * | 2/1979 | Brygger | H01R 13/447 174/67 |
| 4,593,541 | A | * | 6/1986 | Hollis | H01R 13/6395 174/67 |
| 4,676,569 | A | * | 6/1987 | Lambert | H01R 13/5213 439/892 |
| 4,707,043 | A | * | 11/1987 | Reed | H01R 13/443 439/282 |
| 4,712,861 | A | * | 12/1987 | Lukas | H01R 24/84 439/142 |

(Continued)

FOREIGN PATENT DOCUMENTS

KR        20130133634 A        12/2013

OTHER PUBLICATIONS

European EP Extended Search Report for EP Application No. 21217604.4 dated May 2, 2022.

*Primary Examiner* — Peter G Leigh
(74) *Attorney, Agent, or Firm* — Troutman Pepper Locke LLP

(57) ABSTRACT

A boot for preventing unintended contact with live electrical components of a medium voltage control device. The boot having cover for accessing mechanical fasteners used to connect electrical conductors to control equipment when periodic maintenance is required.

20 Claims, 10 Drawing Sheets

(56) References Cited

U.S. PATENT DOCUMENTS

| | | | | |
|---|---|---|---|---|
| 4,749,359 A * | 6/1988 | White | ............... | H01R 13/44 |
| | | | | 379/438 |
| 4,850,014 A * | 7/1989 | Gillis | ............... | H04Q 1/028 |
| | | | | D14/240 |
| 4,957,446 A * | 9/1990 | Belsky | ............... | H01R 13/60 |
| | | | | 439/367 |
| 5,052,939 A * | 10/1991 | Koch | ............... | H01R 13/6397 |
| | | | | 439/304 |
| 5,190,475 A * | 3/1993 | Dickens | ............... | H01R 13/516 |
| | | | | 439/588 |
| 5,288,239 A * | 2/1994 | Johnson | ............... | H01R 13/6397 |
| | | | | 439/304 |
| 5,488,208 A * | 1/1996 | Seewald | ............... | H01R 25/003 |
| | | | | 200/43.11 |
| 5,645,449 A * | 7/1997 | Sabo | ............... | G02B 6/477 |
| | | | | 439/540.1 |
| 5,954,527 A * | 9/1999 | Jhuboo | ............... | A61M 5/16827 |
| | | | | 361/732 |
| 6,007,353 A * | 12/1999 | Webster | ............... | H02G 3/088 |
| | | | | 439/142 |
| 6,111,201 A * | 8/2000 | Drane | ............... | H02G 15/18 |
| | | | | 174/92 |
| 7,094,094 B2 * | 8/2006 | Zahnen | ............... | H01R 13/5208 |
| | | | | 439/798 |
| 7,440,260 B2 * | 10/2008 | Parker | ............... | H02B 1/21 |
| | | | | 361/620 |
| 7,450,368 B2 * | 11/2008 | Parker | ............... | H02B 13/02 |
| | | | | 361/620 |
| 7,488,201 B2 * | 2/2009 | Yoon | ............... | H01M 50/505 |
| | | | | 439/522 |
| 7,632,460 B2 * | 12/2009 | Catt | ............... | G01N 21/8483 |
| | | | | 436/514 |
| 7,717,740 B2 * | 5/2010 | Zahnen | ............... | H01R 13/523 |
| | | | | 439/798 |
| 9,509,097 B2 * | 11/2016 | Peckham | ............... | H01R 13/447 |
| 9,935,442 B2 * | 4/2018 | Lin | ............... | H02G 3/18 |
| 9,969,279 B2 * | 5/2018 | Southey | ............... | B60K 15/05 |
| 10,910,762 B2 * | 2/2021 | Kosaka | ............... | H01R 13/5213 |
| 11,121,503 B1 * | 9/2021 | Kan | ............... | H01R 13/639 |
| 12,034,244 B2 * | 7/2024 | Enger | ............... | H01M 50/574 |
| 2006/0246781 A1 | 11/2006 | Yoon et al. | | |
| 2017/0047684 A1 * | 2/2017 | Peckham | ............... | H01R 13/447 |
| 2020/0076168 A1 | 3/2020 | Najar et al. | | |
| 2022/0102900 A1 * | 3/2022 | Enger | ............... | H01M 50/588 |

* cited by examiner

ELECTRICALLY INSULATED BOOTS PREVENTING UNINTENDED CONTACT WITH LIVE ELECTRICAL CONDUCTORS

CROSS REFERENCE TO RELATED APPLICATIONS

This application claims the benefit of and priority to U.S. Provisional Application No. 63/131,514, filed on Dec. 29, 2020 under 35 U.S.C. 119(e), which application is incorporated by reference herein in its entirety.

FIELD OF THE INVENTION

The invention is generally directed to electrical equipment requiring regular maintenance and particularly to electrically insulating boots preventing unintended contact with live electrical conductors.

BACKGROUND OF THE INVENTION

Many types of electrical equipment require regular preventive maintenance requiring access to electrical conductors. This equipment also requires some method for preventing unintentional contact with live electrical conductors between preventive maintenance periods. These methods for preventing unintentional contact with live electrical conductors must also permit easy access to the electrical conductor when preventive maintenance is being done.

SUMMARY OF THE INVENTION

The problem cited above is solved by the present invention, which provides a flexible nonconductive boot that can enclose areas of the electrical conductors that have mechanical fasteners. Mechanical fasteners require periodic maintenance to ensure that the proper torque for a positive electrical connection between electrical conductors is maintained. For a proper visual and mechanical check of the electrical connection an easy means for accessing the conductors and mechanical fasteners is required.

An electrically insulated boot configured for enclosing an electrical connection between two or more electrical conductors comprising:

a boot having a side wall defining an opening for accessing the electrical connection;

a cover attached to the side wall by a hinge such that the cover can be selectively moved between a closed position preventing access to the enclosed electrical conductors and an open position permitting access to the enclosed electrical conductors;

a cover securing means preventing the cover from being unintentionally moved from the closed position to the open position; and a boot securing means for preventing the boot from being removed from the electrical conductors.

DETAILED DESCRIPTION OF THE EXAMPLE EMBODIMENTS

Figure 1:
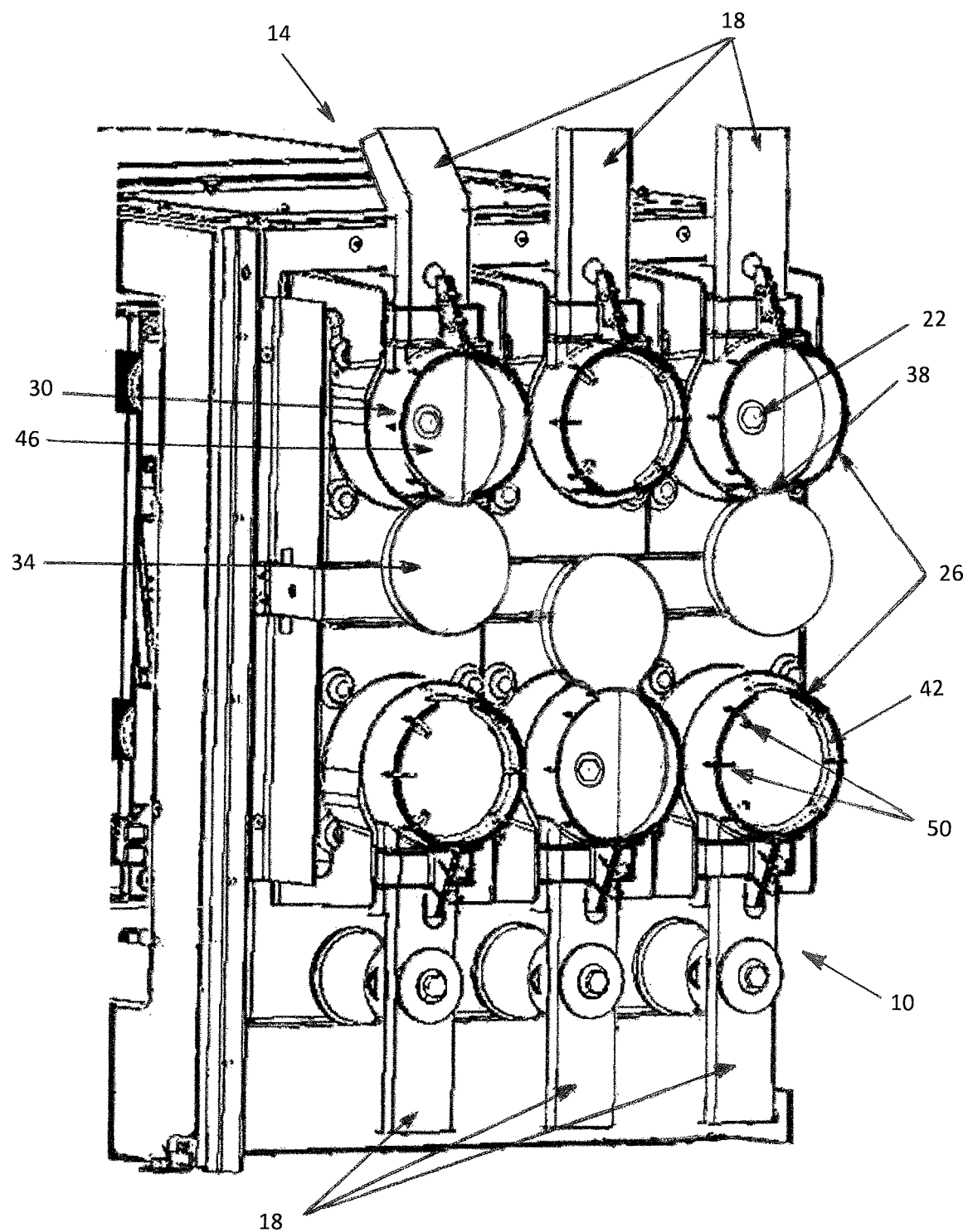
FIG. 1 illustrates the back side of a typical medium voltage control device with boots installed over bolted electrical connections, according to one embodiment described herein.

Referring to FIG. 1, the back side 10 of a medium voltage control device 14 is illustrated. Electrical conductors 18, commonly known as busbars, are shown at the top and bottom of the back side 10 of a medium voltage control device 14. One set of electrical conductors 18 are input conductors bringing power to the medium voltage control device and the other set of electrical conductors 18 are output conductors providing power to a load (not shown), which could be a single electrical device, a group of electrical devices, a particular section of a facility or other device(s) that consume electrical energy. Between the input and output electrical conductors 18 is a control device (not shown), which could be a circuit breaker, switch or other means of controlling the electrical energy being provided to the load.

Each electrical conductor 18 is electrically connected to a primary electrical contact 54 (shown in FIG. 2) by a mechanical fastener 22, such as a bolt or similar threaded fastener. A boot 26 surrounds each of the electrical connections and a short section of the electrical conductor 18 adjacent the to the electrical connection. The boot 26 is made from a pliable electrically insulating material such as plastisol. The boot 26 is generally circular in shape and includes a side wall 30 and a cover 34. The side wall 30 forms a tube-like structure which surrounds the electrical connection, mechanical fasteners 22 and immediately adjacent portions of the electrical conductors 18.

The cover 34 prevents unintentional contact with the electrical conductors 18 and mechanical fasteners 22 of the electrical connection when closed and permits direct access to the mechanical fasteners 22 when opened for periodic maintenance such as checking the torque of the mechanical fasteners 22. The cover 34 is molded integrally with the side wall 30 forming a hinge 38 at their juncture. The cover 34 is permitted to rotate with respect to the side wall 30 between its closed position and its open position via the hinge 38. The cover 34 defines an outwardly extending flange 42 around its perimeter which fits snugly in a circular opening 46 defined by the side wall 30 of the boot 26. The cover 34, when in its closed and open positions, is approximately at 90 degrees with respect to the side wall 30. The cover 34 is held in its closed position by any easily removable and replaceable means that can secure the cover flange 42 to the side wall 30, such as wire ties 50. It is to be understood that the means for holding the cover 34 in the closed position can include other methods that are part of the molding operation such as interlocking ribs and grooves.

Figure 2:
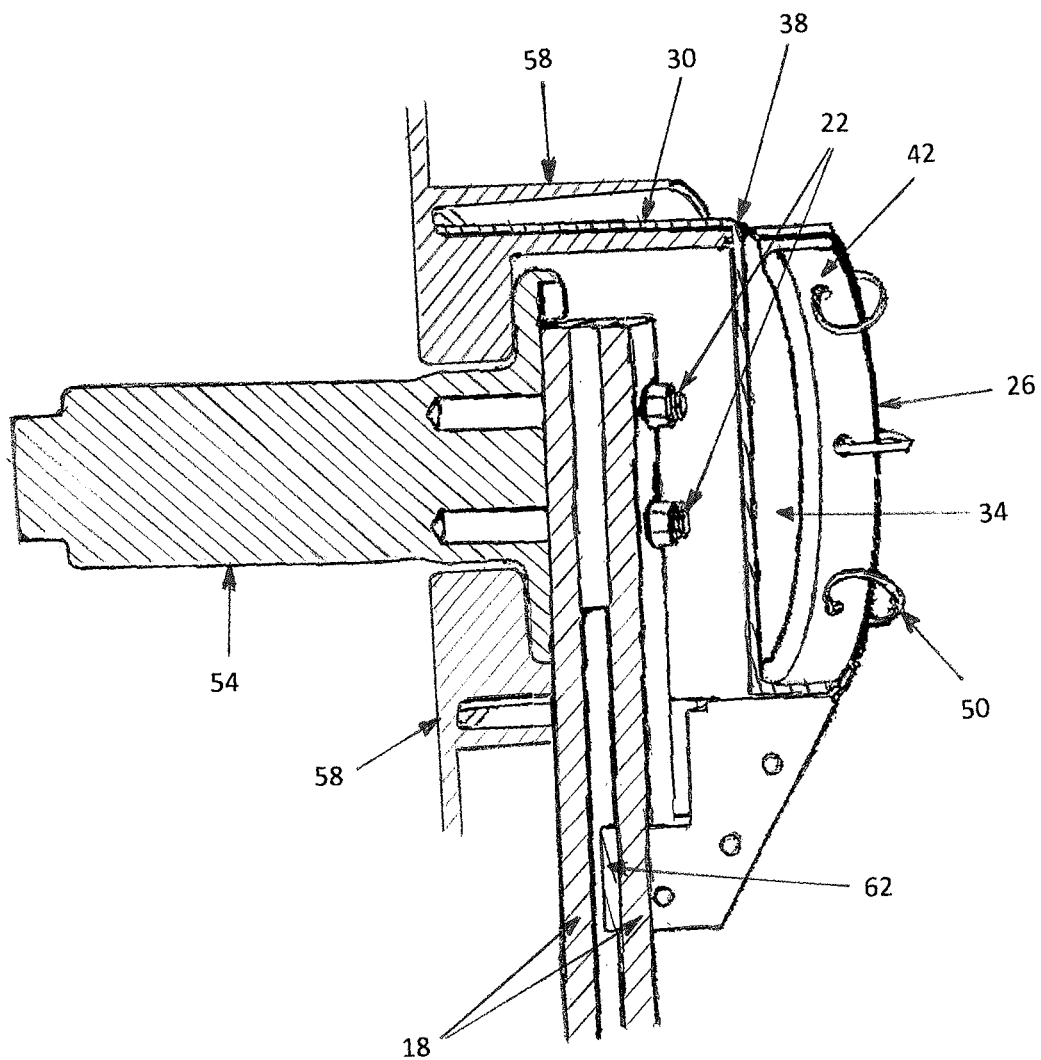
FIG. 2 illustrates in cross-section a boot installed over a bolted electrical connection, according to one embodiment described herein.

Referring to FIG. 2, the boot 26 and electrical connection are illustrated in cross-section. The electrical conductors 18 are electrically connected to a primary electrical contact 54 by the mechanical fasteners 22. The primary electrical contact 54 is the electrical interface between the electrical conductors 18 and the electrical control devices located in a front part of the medium voltage control device 14. The primary electrical contact 54 is secured to an electrically insulating bushing 58. The boot 26 includes a securing means 62 which surrounds at least one of the electrical conductors 18. The securing means 62 and boot side wall 30, which engages a portion of the insulating bushing 58, hold the boot 26 in place around the electrical connection.

Figure 3:
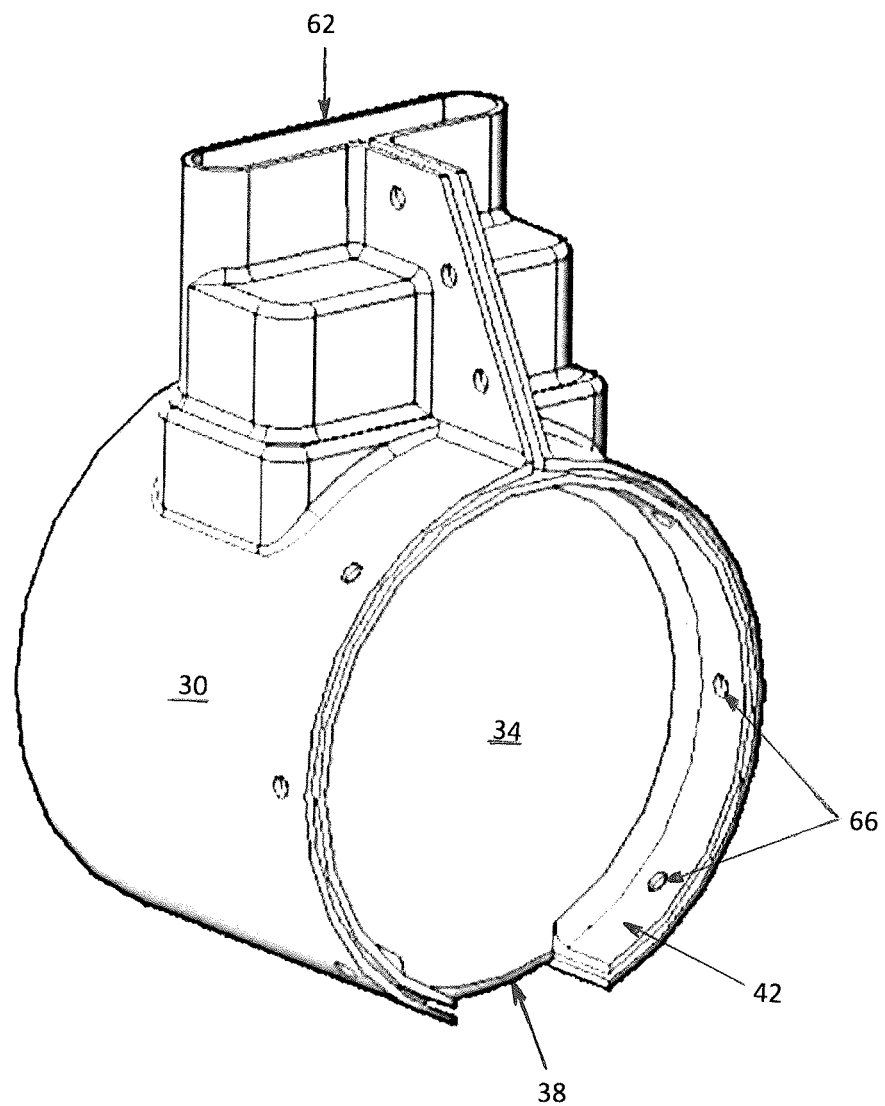
FIG. 3 illustrates in more detail a boot with the cover closed, according to one embodiment described herein.

Referring to FIG. 3, the boot 26 is shown in more detail with the cover 34 closed and in the orientation for receiving electrical conductors 18 from above. If wire ties 50 are used to secure the cover flange 42 to the side wall 30 holes 66 can easily be punched in the cover flange 42 and side wall 30.

Figure 4:
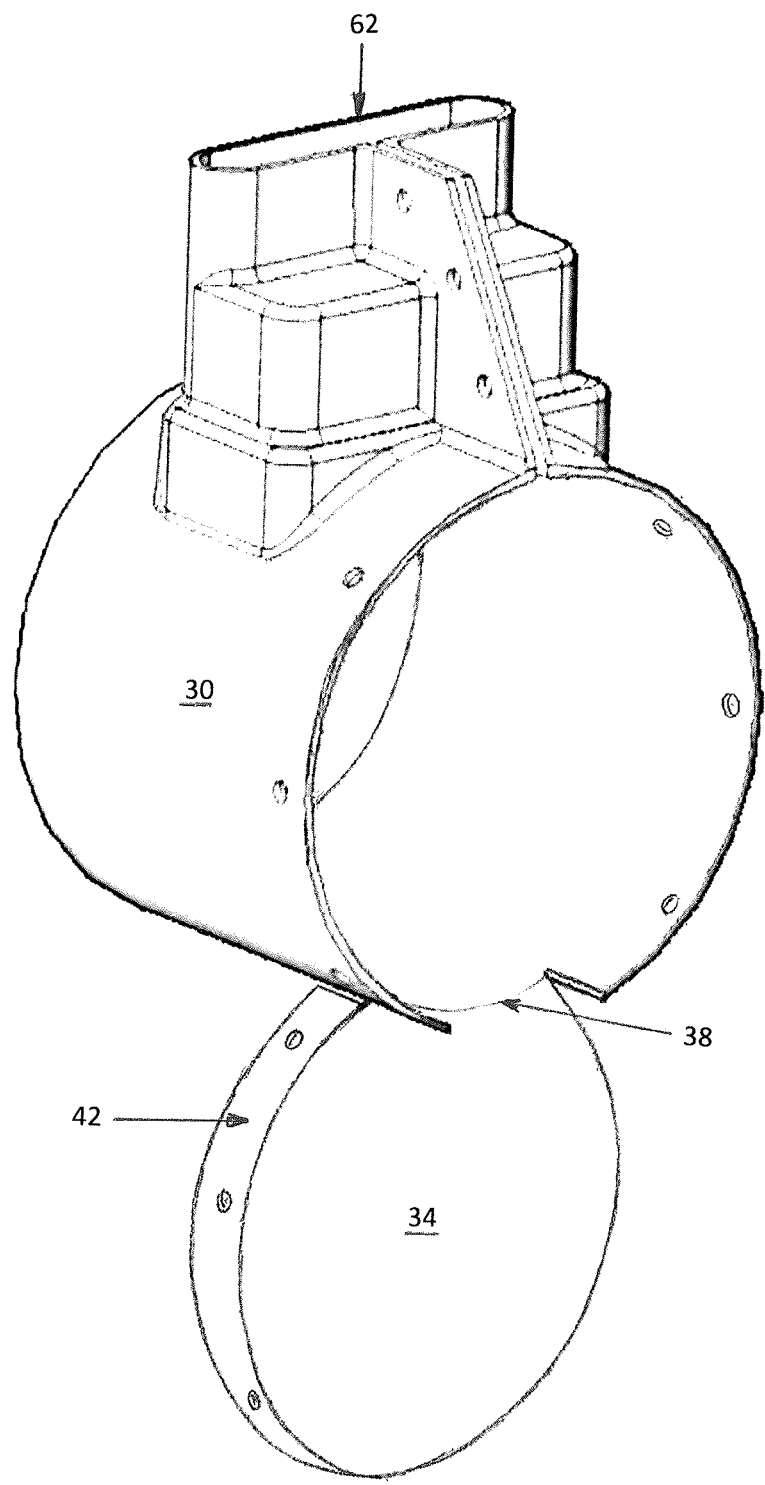
FIG. 4 illustrates in more detail a boot with the cover open, according to one embodiment described herein.

Referring to FIG. 4, the boot 26 is shown in more detail with the cover 34 open and in the orientation for receiving electrical conductors 18 from above.

Figure 5:
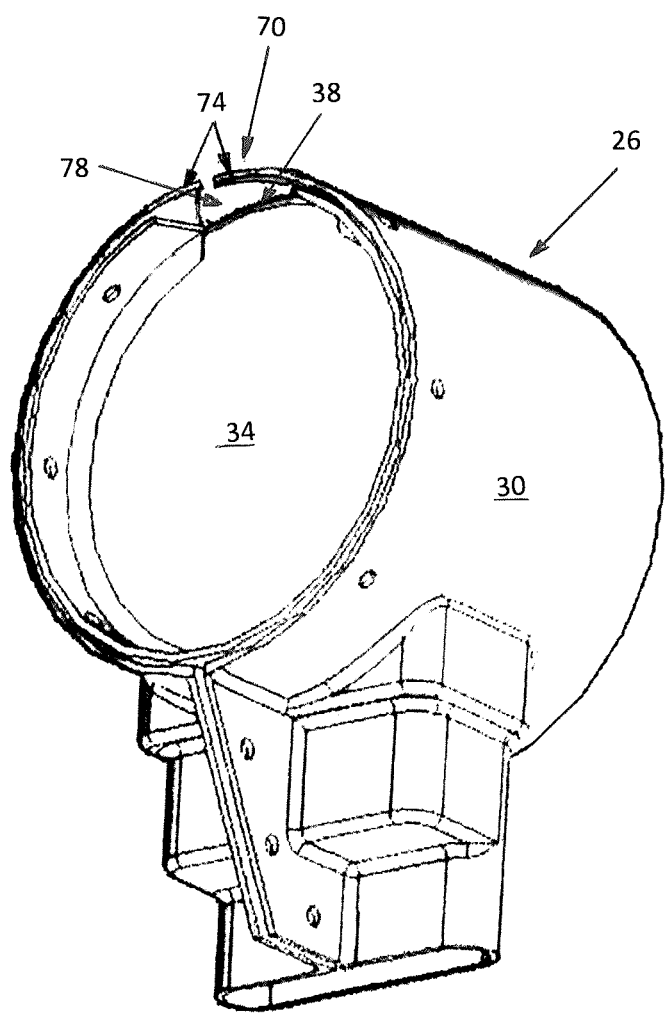
FIGS. 5-10 illustrate a boot having a cover hold-open feature, according to one embodiment described herein.
Figure 6:
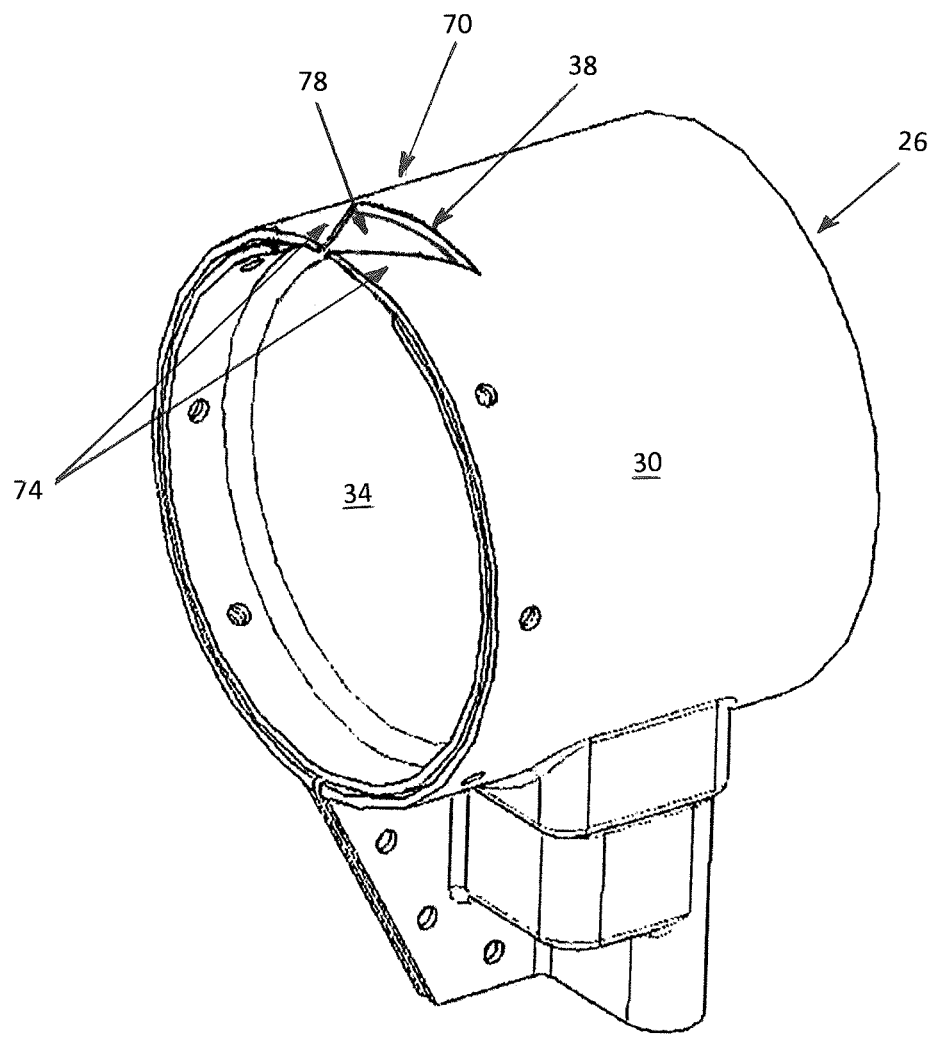
Figure 7:
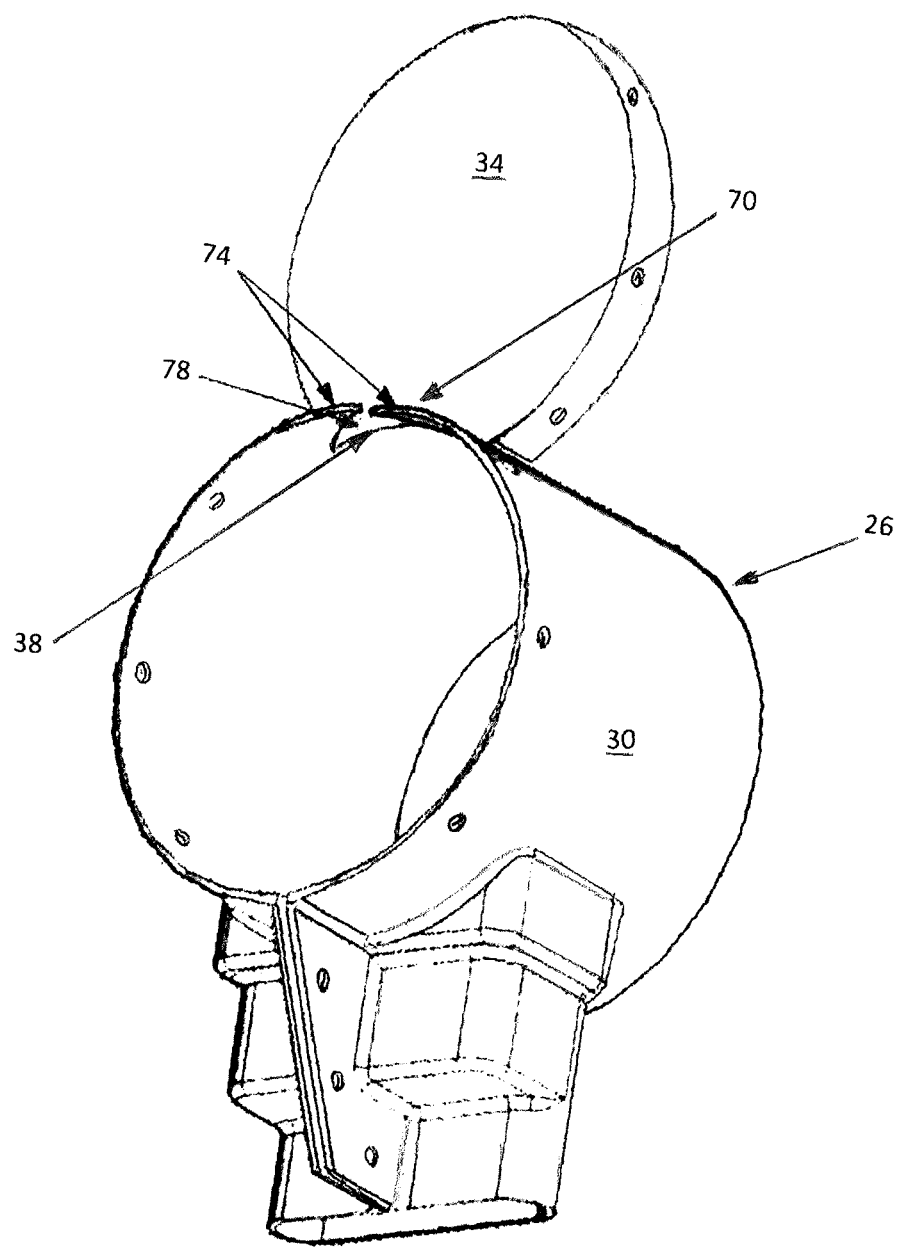
Figure 8:
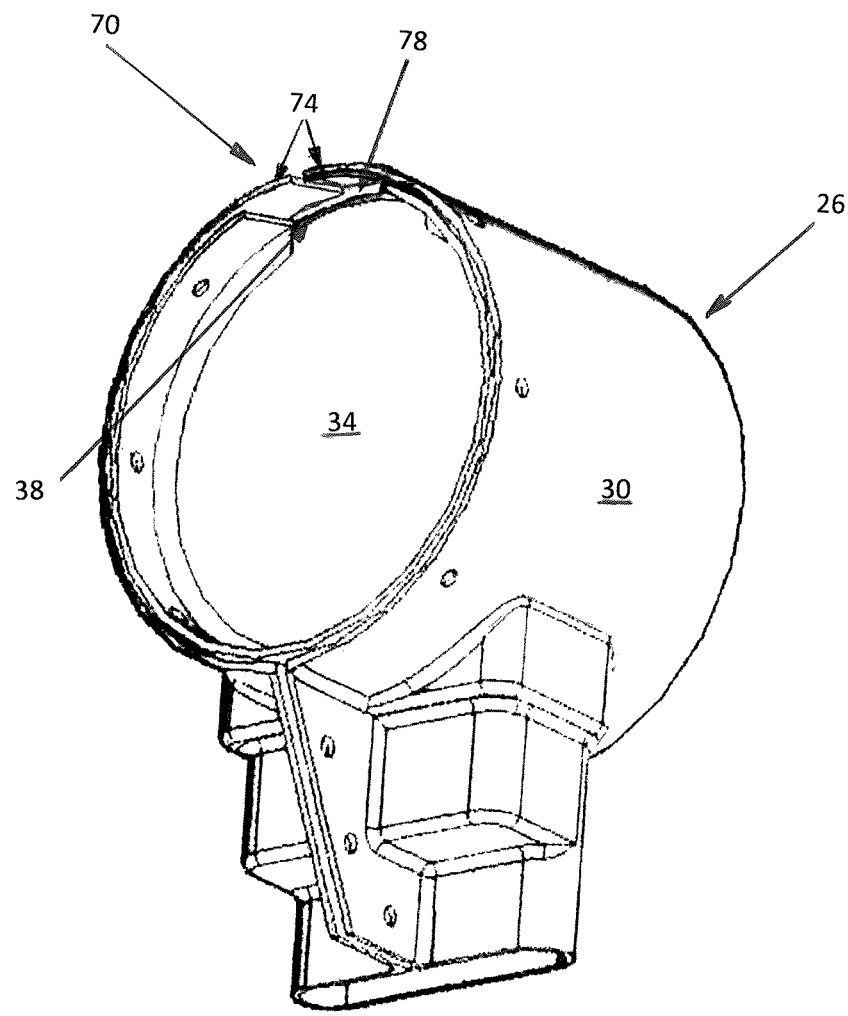
Figure 9:
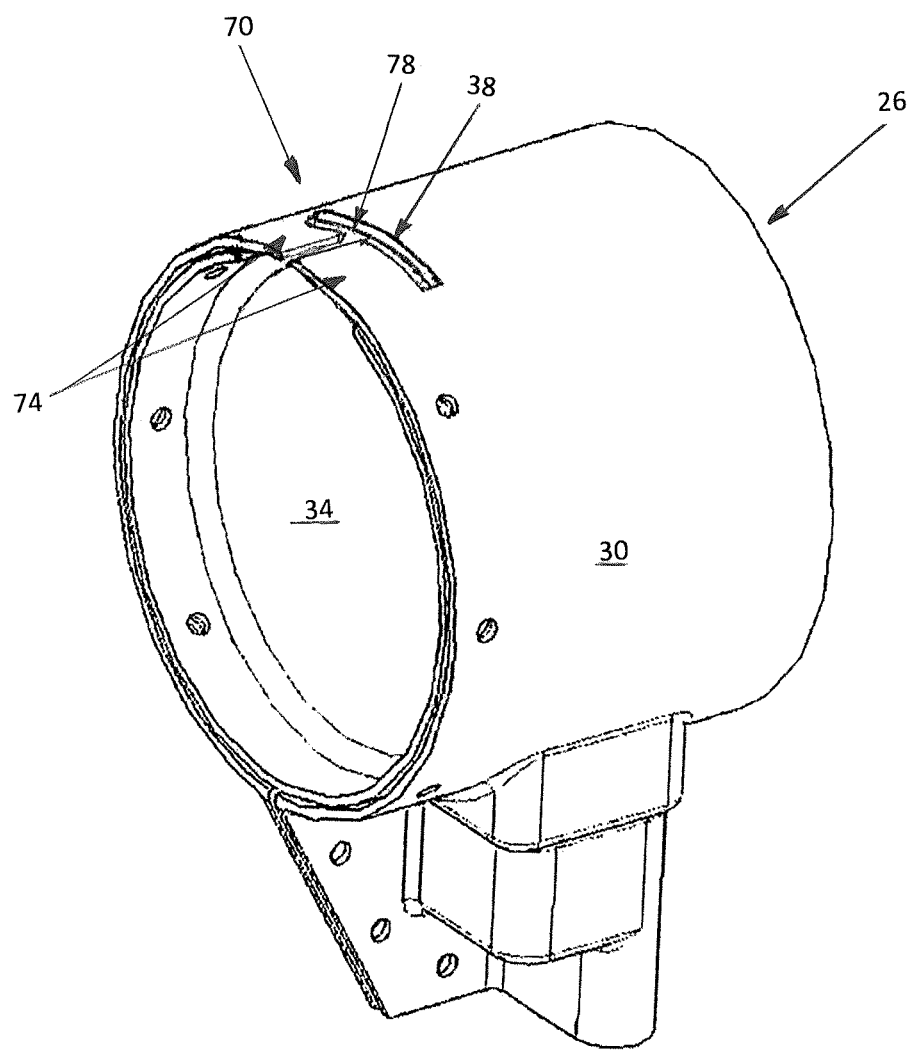
Figure 10:
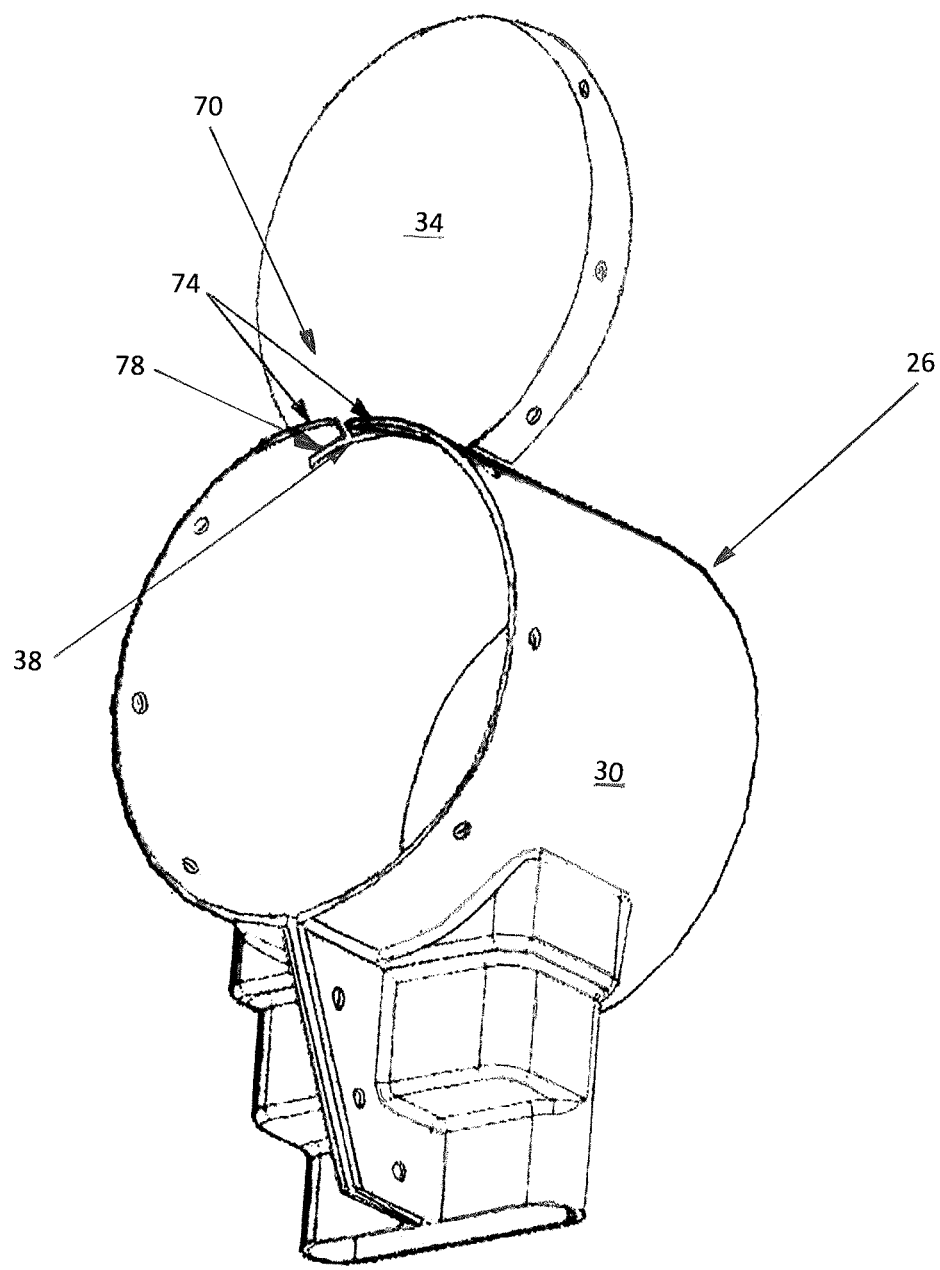

Referring to FIGS. 5-10, alternate embodiments of the boot 26 having a cover hold-open feature 70 are illustrated. When the boot 26 is receiving electrical conductors 18 from below the cover hold-open feature 70 prevents the cover 34 from closing due to gravity. The cover hold-open feature 70 is integrally molded in the side wall 30 of the boot. The cover hold-open feature 70 is a gate or pair of gates 74, extending from one or both sides side of a gap 78 in the side wall 30 above the hinge 38. The cover 34 must be pushed past the gate(s) 74 to open position and pushed past the gate(s) 74 to close position. When the cover 34 is in the open position the gate(s) 74 provide sufficient interference to prevent the cover 34 from interfering with access to the mechanical fasteners 22 during required periodic maintenance. FIGS. 5-7 illustrate generally triangular shaped gates 74 and FIGS. 8-10 illustrate generally rectangular gates 74. It is to be understood that the gate(s) 74 could have other shapes and still provide the function of the cover hold-open feature 70.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

The various embodiments disclosed herein may be implemented as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer-readable medium(s) having computer-readable program code embodied thereon.

Any combination of one or more computer-readable medium(s) may be utilized. The computer-readable medium may be a non-transitory computer-readable medium. A non-transitory computer-readable medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer-readable medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. Moreover, such computer program code can execute using a single computer system or by multiple computer systems communicating with one another (e.g., using a local area network (LAN), wide area network (WAN), the Internet, etc.). While various features in the preceding are described with reference to flowchart illustrations and/or block diagrams, a person of ordinary skill in the art will understand that each block of the flowchart illustrations and/or block diagrams, as well as combinations of blocks in the flowchart illustrations and/or block diagrams, can be implemented by computer logic (e.g., computer program instructions, hardware logic, a combination of the two, etc.). Generally, computer program instructions may be provided to a processor(s) of a general-purpose computer, special-purpose computer, or other programmable data processing apparatus. Moreover, the execution of such computer program instructions using the processor(s) produces a machine that can carry out a function(s) or act(s) specified in the flowchart and/or block diagram block or blocks.

The flowchart and block diagrams in the Figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

We claim:

1. An electrically insulated boot configured for enclosing an electrical connection between two or more electrical conductors, the boot comprising:

a side wall defining an opening for accessing the electrical connection;

a cover attached to the side wall by a hinge such that the cover can be selectively moved between a closed position preventing access to the enclosed electrical connection and an open position permitting access to the enclosed electrical connection, the cover including a cover flange extending outwardly along a perimeter of the cover;

a cover securing means including at least one aperture in the side wall and at least one coinciding aperture in the cover flange, the at least one aperture in the side wall and the at least one coinciding aperture in the cover flange configured to receive a fastener therein to prevent the cover from being unintentionally moved from the closed position to the open position; and a boot securing means for preventing the boot from being removed from the electrical conductors.

2. The electrically insulated boot of claim 1, wherein the boot comprises a pliable electrically insulating material.

3. The electrically insulated boot of claim 1, wherein the side wall defines a tubelike structure which surrounds the electrical connection of the electrical conductors.

4. The electrically insulated boot of claim 1, wherein the cover flange fits snugly in the opening.

5. The electrically insulated boot of claim 1, wherein the cover securing means passes through coinciding apertures in the side wall and the cover flange.

6. The electrically insulated boot of claim 1, wherein the hinge between the side wall and cover comprises a pliable electrically insulating material.

7. The electrically insulated boot of claim 6, wherein the hinge is an integral part of the side wall and cover.

8. The electrically insulated boot of claim 1, wherein the boot securing means encloses a portion of at least one of the electrical conductors.

9. The electrically insulated boot of claim 1, wherein a hold open feature integrally formed from the side wall maintains the cover in the open position.

10. The electrically insulated boot of claim 9, wherein the hold open feature is a gate through which the hinge must pass when the cover is moved from one of the open or closed positions to the other of the open or closed positions.

11. An electrically insulated boot for enclosing an electrical connection between two or more electrical conductors, the boot comprising:

a side wall defining an opening for accessing the electrical connection;

a cover attached to the side wall by a hinge such that the cover can be selectively moved between a closed position preventing access to the enclosed electrical connection and an open position permitting access to the enclosed electrical connection;

a cover securing means configured to prevent the cover from being unintentionally moved from the closed position to the open position;

a boot securing means configured to prevent the boot from being removed from the electrical conductors; and a cover hold open feature configured to prevent the cover from unintentionally moving from the open position to the closed position.

12. The electrically insulated boot of claim 11, wherein the boot comprises a pliable electrically insulating material.

13. The electrically insulated boot of claim 11, wherein the shape of the opening and the shape of the cover are identical.

14. The electrically insulated boot of claim 13, wherein the cover has a cover flange which engages the side wall when the cover is closed.

15. The electrically insulated boot of claim 14, wherein the cover securing means passes through coinciding apertures in the side wall and the cover flange.

16. The electrically insulated boot of claim 15, wherein the securing means is a cable tie or similar device which can be easily installed or removed.

17. The electrically insulated boot of claim 11, wherein the cover hold open feature is a gate positioned above the hinge.

18. The electrically insulated boot of claim 17, wherein the hinge must pass through the gate when the cover is moved from one of the open or closed positions to the other of the open or closed positions.

19. The electrically insulated boot of claim 11, wherein at least one of the two or more electrical conductors is a busbar and the boot securing means is configured to prevent the boot from being removed from the busbar.

20. An electrically insulated boot configured for enclosing an electrical connection between two or more electrical conductors, the boot comprising:

a side wall defining an opening for accessing the electrical connection;

a cover attached to the side wall by a hinge such that the cover can be selectively moved between a closed position preventing access to the enclosed electrical connection and an open position permitting access to the enclosed electrical connection, the cover including a cover flange extending outwardly along a perimeter of the cover;

at least one aperture in the side wall and at least one coinciding aperture in the cover flange, the at least one aperture in the side wall and the at least one coinciding aperture in the cover flange configured to receive a fastener therein to prevent the cover from being unintentionally moved from the closed position to the open position; and a passageway extending from a portion of the side wall generally perpendicularly thereto, the passageway defining a passage in which to receive at least one electrical conductor to prevent the boot from being removed from the electrical conductors.

\* \* \* \* \*